July 22, 1930.  G. LUNDQUIST  1,771,263
QUACK GRASS DIGGER AND REMOVER
Filed March 19, 1928
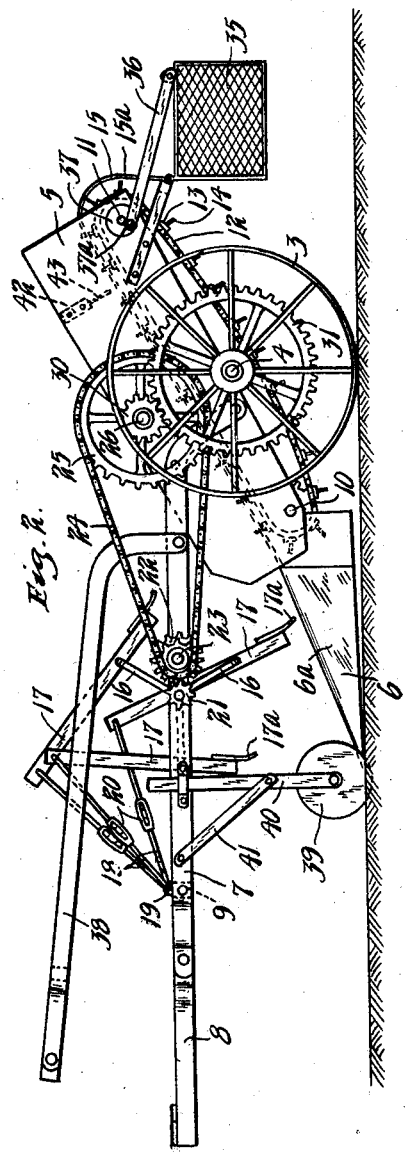
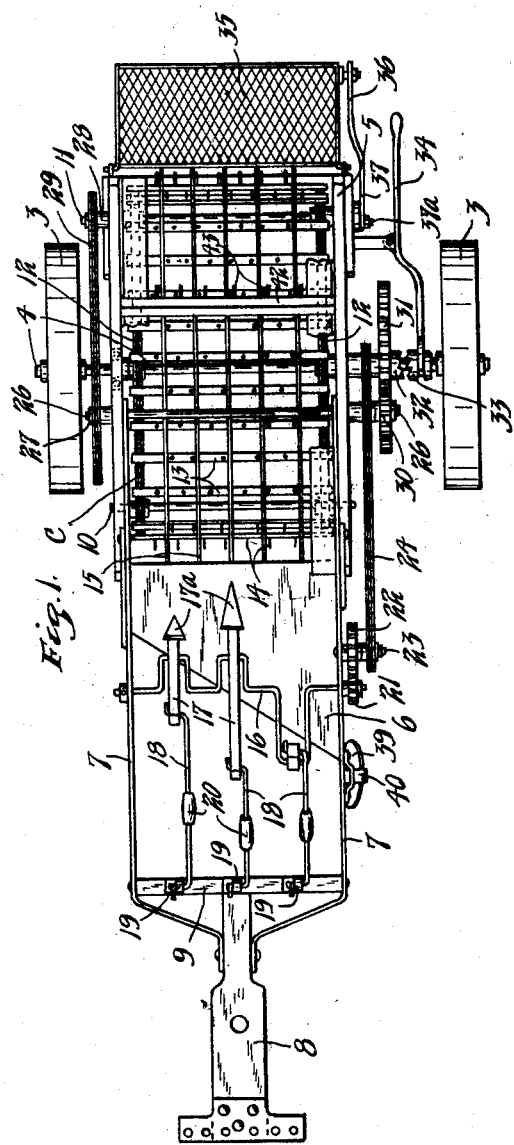
INVENTOR.
GUST LUNDQUIST.
BY HIS ATTORNEYS.

Patented July 22, 1930

1,771,263

UNITED STATES PATENT OFFICE

GUST LUNDQUIST, OF NORTHWOOD, NORTH DAKOTA, ASSIGNOR OF ONE-HALF TO FRITZ EINAR MUHRBECK, OF HANCOCK, MINNESOTA

QUACK-GRASS DIGGER AND REMOVER

Application filed March 19, 1928. Serial No. 262,625.

This invention relates to devices for digging and collecting quack grass and other weeds.

It is an object of my invention to provide a highly efficient quick grass digger which will have a high capacity for work, which may be economically operated and which will efficiently remove and collect quack grass or other weeds without accumulating a considerable amount of soil.

Another object is to provide a quack grass digger and remover adapted to be drawn by horse power or tractor, wherein means are provided for digging and removing a shallow surface of the soil, said means co-operating with means for disintegrating the soil and removing the quack grass or other weeds therefrom.

A still further object is to provide an efficient quack grass digger having a digging blade adapted to remove the top layer of the soil containing the quack grass or other weeds, mechanism for disintegrating a layer of soil removed and for assisting in moving said soil to the rear of said digger and mechanism for removing the dirt from the quack grass and weeds and for returning the dirt to the ground, said means delivering the cleaned grass and weeds to a collector.

These and other objects and advantages of the invention will be fully set forth in the following description made in connection with the accompanying drawings, wherein like reference characters refer to similar parts throughout the several views and in which:—

Fig. 1 is a plan view of a preferred embodiment of my invention; and

Fig. 2 is a side elevation of the same.

As illustrated in the drawings, I provide a frame of the sulky type, having the rear wheels 3 loosely mounted on the axle 4. A conveyor frame having spaced vertical sides 5 is pivoted to the axle 4, said conveyor frame carrying at its forward end an inclined digger blade 6, said digger blade having a diagonal forward cutting edge provided with triangular shaped vertical sides 6ª. A pair of spaced horizontal bars 7 having downwardly curved rear ends are secured at said rear ends to the sides 5 of the conveyor frame, said bars having inturned forward extremities which are secured to a draft tongue 8. A cross bar 9 is interposed between bars 7 and secured to the rear end of tongue 8, spacing said bars apart. Transverse shafts 10 and 11 are mounted in the upper and lower ends of the conveyor frame respectively, said shafts extending across and being journaled in the vertical sides 5 of said frame. Shafts 10 and 11 carry suitable sprockets over which an endless conveyor, designated as an entirety by the letter C is trained. Conveyor C, as illustrated, comprises a pair of endless side chains 12 across which a plurality of spaced slats 13 are secured, said slats each carrying a plurality of outwardly projecting teeth or pins 14, the pins of said several slats being preferably staggered.

A series of parallel spaced rods or bars 15 are mounted above conveyor C positioned longitudinally of the conveyor frame and extending from the delivery end of the inclined digger blade 6 to the rear end of the conveyor frame, said rods having their rear ends 15ª curved downwardly, as shown in Fig. 2.

A crank shaft 16 extends transversely of spaced bars 7 and has its ends journaled in suitable bearings fixed to said bars. As shown, crank shaft 16 is provided with three crank arms, said arms extending radially from the axis of said shaft and defining equal angles of substantially 120°. Each of said arms is pivoted to a chopping member or breaker bar 17 adjacent the lower ends of said bars, said bars terminating in pointed shoes 17ª, the purpose of which will later be described. The upper or opposite extremities of bars 17 are pivotally secured to the rear ends of a plurality of links 18, said links being pivoted at their forward ends for oscillation to suitable bearings 19 fixed to the cross bar 9. As shown, links 18 are also provided with suitable turn buckles 20 for adjusting the lengths thereof One extremity of crank shaft 16 projects laterally beyond one of the bars 7 and has affixed thereto a pinion 21. Pinion 21 is in constant mesh with a gear 22 mounted on a suitable stub shaft 23 which is carried by bar 7, said gear, as shown, being fixed to a sleeve, said sleeve being drivably connected by an endless chain 24 to a relatively large sprocket 25. Sprocket 25 is fixed to a shaft 26 extending transversely of the conveyor frame and considerably above the rods 15. The opposite end of shaft 26 has fixed thereto a suitable sprocket 27 connected to a sprocket 28 by means of an endless chain 29, said sprocket 28 being fixed to the upper conveyor shaft 11. A small gear 30 is rigidly fixed to shaft 26 just outwardly of the sprocket 25, said gear 30 being in constant mesh with a large gear 31 loosely mounted on the axle 14 of my device. Gear 31 carries a clutch element 32 and a slidable clutch collar 33 fixed to axle 14 is adapted to be meshed with clutch element 32 by means of a suitable shipper fork 34 fulcrumed to the rear end of the conveyor frame. A collecting receptacle 35 is hinged along one longitudinal edge to the rear of the conveyor and has a shaker bar 36 pivotally secured to a suitable lug adjacent its free longitudinal edge, said shaker bar at its opposite end being pivoted to an eccentric pin 37$^a$ carried by eccentric 37 which is fixed to one end of conveyor shaft 11. As illustrated, a pair of additional draft bars 38 having downwardly curved rear extremities may be pivoted to the rear portions of bars 7 extending forwardly above draft tongue 8.

Just forwardly of digger blade 6 I mount a cutting disc 39 substantially alined with the left hand edge of said digger blade. Cutter disc 39 may be rotatably mounted in any suitable manner, such as by means of a depending shank 40 attached at its upper end to the left hand bar 7 and braced by means of a diagonal bar 41, the lower edge of said cutting disc projecting slightly below the cutting edge of blade 6. I mount a transverse bar 42 across the vertical sides of conveyor frame 5 and positioned considerably above the top of rods 15. Bar 42 carries a plurality of depending teeth 43 constituting a rake, said teeth working between rods 15 and between the several teeth 14. The teeth and rods are thus kept unobstructed during the movement of the conveyor.

Operation

The operation of my improved quack grass digger and remover may be briefly described as follows:—

The draft tongue 8 and bars 30 are suitably coupled to a tractor or hitch and the sulky frame is drawn over the ground. Cutting disc 39 cuts the soil at the left hand side and most forward point of the digging blade 6 cutting to a suitable depth for removal of the quack grass. The diagonal edge of the digger blade is moved through the ground and scoops up the top layer of soil containing the quack grass or other weeds, the movement of the wheeled frame causing the soil to be forced rearwardly over the blade 6. Assuming clutch members 32 and 33 in mesh, crank shaft 16 will be revolved and the breaker bars or chopping members 17 will be moved downwardly against the soil adjacent the cutting edge of the blade and then upwardly disintegrating the soil with the quack grass therein and assisting in moving said soil upwardly and rearwardly over the digger blade. Three positions of said breaker bars are illustrated in Fig. 2, showing the manner in which the same function. The disintegrated soil containing the quack grass or weeds is delivered to the forward end of conveyor C, the larger material, including the grass and weeds being retained on top of longitudinally disposed rods 15 and the soil and heavier material falling between said rods and returning to the ground. The staggered teeth 14 of the several slats of the conveyor move between rods 15 and carry the grass and weeds upwardly delivering the same free of dirt and stones, at the rear end of the conveyor. The grass and weeds drop into the collector basket 35 and said basket is shaken by means of its eccentric connection with the disc 37, thereby freeing the collected material of any small amount of dirt which may have accumulated therewith. Suitable means (not shown) may be supplied for tripping and emptying basket 35.

It will be seen that the small gear 30 secured to shaft 26 is driven in a direction opposite to that of the movement of the implement wheels 3, thus driving the conveyor through its connection by chain 29 with sprocket 28 in a rearward direction. Gear 22 is also driven in a direction opposite to that of the implement wheels 3 and being meshed with pinion 21 causes crank shaft 16 to revolve in the same direction as wheels 3. Turn buckles 20 provide means for adjusting the links 18 as desired.

It will be seen that with my device the entire top layer of soil containing grass and weeds may be removed and thereafter will be disintegrated by the breaker bars 17 and raked by means of the teeth 14, on conveyor C, the dirt and stones dropping through the conveyor and the weeds and grass being collected in basket 35. My device, obviously, has a high capacity for work and positively rids the soil of the undesirable weeds and quack grass.

It will, of course, be understood that various changes may be made in the form, details, arrangement and proportions of the parts without departing from the scope of applicant's invention.

The weight of the quack grass and sod is carried by the spacer rods 15 rather than on the conveyor belt and the teeth 14 work through said rods, the teeth of rake 42 keeping the conveyor clear of obstructions.

What is claimed is:

1. A quack grass digger or the like, comprising a wheeled frame, a digger blade adapted to be moved through the ground and remove a thin layer of soil with quack grass or weeds therein, a plurality of breaker bars mounted above said digger blade, means for causing said bars to move first longitudinally and downwardly against said digger blade and to then swing upwardly, disintegrating the soil and assisting in moving the same rearwardly over said blade, a plurality of spaced inclined rods extending longitudinally of said frame and disposed at their forward ends adjacent the delivery end of said digger blade, an endless conveyor working beneath said rods and carrying outwardly projecting teeth adapted to work between said rods.

2. A quack grass digger or the like, comprising a wheeled frame, a digger blade adapted to be moved through the ground and to remove a thin layer of soil with quack grass or weeds therein, a plurality of breaker bars mounted above said digger blade, means for causing said bars to move first longitudinally and downwardly against said digger blade and to then swing upwardly, disintegrating the soil and assisting in moving the same rearwardly over said blade, a plurality of spaced inclined rods extending longitudinally of said frame and disposed at their forward ends adjacent the delivery end of said digger blade, an endless conveyor working beneath said rods and carrying outwardly projecting teeth adapted to work between said rods, the upper leaf of said conveyor being disposed directly beneath said rods, a collecting receptacle mounted at the delivery end of said conveyor, and means for shaking said receptacle to rid the same of small amounts of dirt.

3. A quack grass digger or the like, having in combination a frame, a blade adapted to move through the ground and remove a thin layer of soil with quack grass, weeds or roots therein, a chopping member suspended above said blade, and means for intermittently moving said chopping member first longitudinally and downward against said digger blade to break up the soil in its passage over said blade and then upwardly, and an openwork conveyor receiving from said blade adapted to separate quack grass, weeds and roots from the soil.

4. A quack grass digger and remover or the like, having in combination a wheeled frame, a blade carried thereby adapted to move through the ground and remove a thin layer of soil with quack grass, weeds and roots therein, a crank shaft journaled in said frame above said blade and having a plurality of cranks thereon, a plurality of elongated breaker bars respectively mounted on said cranks, said breaker bars having ends extending above said cranks, connections between said ends and said frame, driving connections between said crank shaft and a wheel of said frame whereby the lower ends of said bars will be moved longitudinally against said blade to chop material passing over said blade and an endless cleaning conveyor receiving from said blade.

5. A quack grass digger and remover or the like, having in combination, a wheeled frame, a blade connected to the forward portion of said frame and adapted to move through the ground to cut and remove a thin layer of soil having quack grass, roots or weeds therein, a horizontal crank shaft journaled in said frame above said blade and having a plurality of cranks thereon, a plurality of breaker bars having their intermediate portions respectively mounted on said cranks, oscillatory links connecting the upper ends of said bars with the forward portion of said frame, a series of spaced rods extending longitudinally of the frame behind said blade and an endless conveyor working beneath said rods having teeth working between said rods.

In testimony whereof I affix my signature.

GUST LUNDQUIST.